United States Patent [19]

Törmä

[11] Patent Number: 5,463,302
[45] Date of Patent: Oct. 31, 1995

[54] SLIP COMPENSATION METHOD IN A SQUIRREL CAGE INDUCTION MOTOR

[75] Inventor: Törmä, Helsinki, Finland

[73] Assignee: ABB Industry Oy, Helsinki, Finland

[21] Appl. No.: 303,756

[22] Filed: Sep. 9, 1994

[30] Foreign Application Priority Data

Sep. 24, 1993 [FI] Finland ................................ 934200

[51] Int. Cl.$^6$ ........................................... H02P 5/28
[52] U.S. Cl. ..................... 318/807; 318/801; 318/806; 318/811; 388/832
[58] Field of Search .................................. 318/807, 801, 318/806, 811; 388/832

[56] References Cited

U.S. PATENT DOCUMENTS 4,926,105  5/1990  Mischenko et al. ............... 318/807
5,272,429  12/1993  Lipo et al. ............................ 318/807

OTHER PUBLICATIONS

Power Electronics; Mohan et al.; 1989; pp. 311–311, 333 and 335, John Wiley & Sons, New York.

Primary Examiner—William M. Shoop, Jr.
Assistant Examiner—Karen Masih
Attorney, Agent, or Firm—Watson, Cole Grindle & Watson

[57] ABSTRACT

The invention relates to a method for slip compensation in a squirrel cage induction motor when the motor (2) is fed by an inverter (1) without feedback at a supply frequency less than 20% of the rated supply frequency of the motor after the motor has first been fed at a frequency more than 50% of the rated frequency for a period of time at least equal to a mechanical time constant of a combination formed by the motor and a load device, wherein a term (kT) proportional to the torque of the motor is determined and added to the set value of the rotation speed (n) to effect slip compensation. To improve the compensation accuracy, the value of said compensation term is stored in a memory before transition from the frequency more than 50% of the rated frequency to a frequency less than 50% of the rated frequency, and the stored compensation term is used as such for slip compensation when the supply frequency of the motor is less than 20% of the rated frequency.

5 Claims, 1 Drawing Sheet

SLIP COMPENSATION METHOD IN A SQUIRREL CAGE INDUCTION MOTOR

BACKGROUND OF THE INVENTION

This invention relates to a method for slip compensation in a squirrel cage induction motor when the motor is fed by an inverter without feedback at a supply frequency less than 20% of the rated supply frequency of the motor after the motor has first been fed at a frequency more than 50% of the rated frequency for a period of time at least equal to a mechanical time constant of a combination formed by the motor and a load device, wherein a term proportional to the torque of the motor is determined and added to the set value of the rotation speed to effect slip compensation.

Techniques of the type described above are used for the compensation of the slip of squirrel cage induction motors particularly in lifts, conveyors, cranes and trains, in which the motor is normally driven at a greater frequency typically more than 50% of the rated frequency of the motor, but which are driven at a low drift speed before the motor is switched off, whereby the supply frequency of the motor is typically less than 20% of the rated frequency of the motor. In this way, stopping can be performed smoothly. If the system does not comprise position feedback or speed feedback e.g. from a tachometer measuring the rotation speed of the motor, speed variation caused by the slip of the motor is to be compensated for electrically. Such a system can be e.g. a positioning drive without feedback information from the motor shaft, where a short distance is driven at a low approach speed which is to be load-independent before positioning in order to improve accuracy.

*Power Electronics,* Mohan, Undelend, Robbins, John Wiley & Sons, New York 1989, page 335, describes a method for electric compensation of the slip of a squirrel cage induction motor, where one aims to keep the rotation speed of the motor independent of the load by adding a term proportional to the torque (T) of the motor to the set value of the rotation speed. The stator frequency (fs) can thus be determined from the equation $$fs=(p/2)(n+kT)/60 \quad (1),$$

where p=the pole number of the motor n=the set value of the rotation speed (r/min)

k=a constant dependent on the degree of magnetization of the machine fs=the stator frequency (Hz)

The term kT in Equation (1) is obtained by an estimated air-gap power Pa obtained by a power measured from an intermediate circuit between a rectifier and an inverter as follows:

$$Pa=Pdc-Pinv-Ps \quad (2),$$

where

Pdc=a power measured from the intermediate circuit

Pinv=the dissipation power of the inverter

Ps=the dissipation power of the stator of the motor.

The torque of the motor in turn is obtained from the air-gap power Pa as follows:

$$T=Pa/Ws \quad (3),$$

where

Ws=the angular frequency of the stator.

However, the accuracy of the above-described method decreases with decreasing frequency, as the proportion of the dissipation powers Pinv and Ps in the measured power of the intermediate circuit increases with decreasing frequency when the load remains constant. When the frequency is 0, the entire power of the intermediate circuit is lost through losses as the air-gap power Pa of the machine is 0. Moreover, in practice, changes in the degree of magnetization caused by the voltage loss of the stator resistance alter the value of the constant k, thus deteriorating the accuracy of the term kT the more the lower the frequency is.

SUMMARY OF THE INVENTION

The inaccuracy caused by the above-described method in slip calculation with decreasing frequency results in variation in the approach speed with different loads. The object of the method according to the invention is to provide a solution in which such approach speed variation is reduced significantly. This is achieved by a method according to the invention which is characterized in that the value of the compensation term is stored in a memory before transition from the frequency more than 50% of the rated frequency to a frequency less than 50% of the rated frequency, and the stored compensation term is used as such for slip compensation when the supply frequency of the motor is less than 20% of the rated frequency.

According to the invention, the accuracy of slip compensation is improved in such a way that the compensation value to be added to the rotation speed of the motor when driving at a low approach frequency (less than 20% of the rated frequency of the motor) is calculated at a higher constant frequency (more than 50% of the rated frequency of the motor), whereby the effect of dissipation powers on the calculation accuracy of the compensation value is insignificant. In particular, the method according to the invention is based on the realization that in drives of the type described above the load is not able to change until the motor has been switched off completely. This is because one cannot leave a lift or a train before it has stopped, i.e., the load of the motor remains constant throughout the period of time when the motor is first driven at a higher rated frequency and then a lower drift speed is applied before stopping.

BRIEF DESCRIPTION OF THE DRAWINGS

In the following the method according to the invention will be described in more detail with reference to the attached drawings, where.

DESCRIPTION OF THE PREFERRED EMBODIMENT

Figure 1:
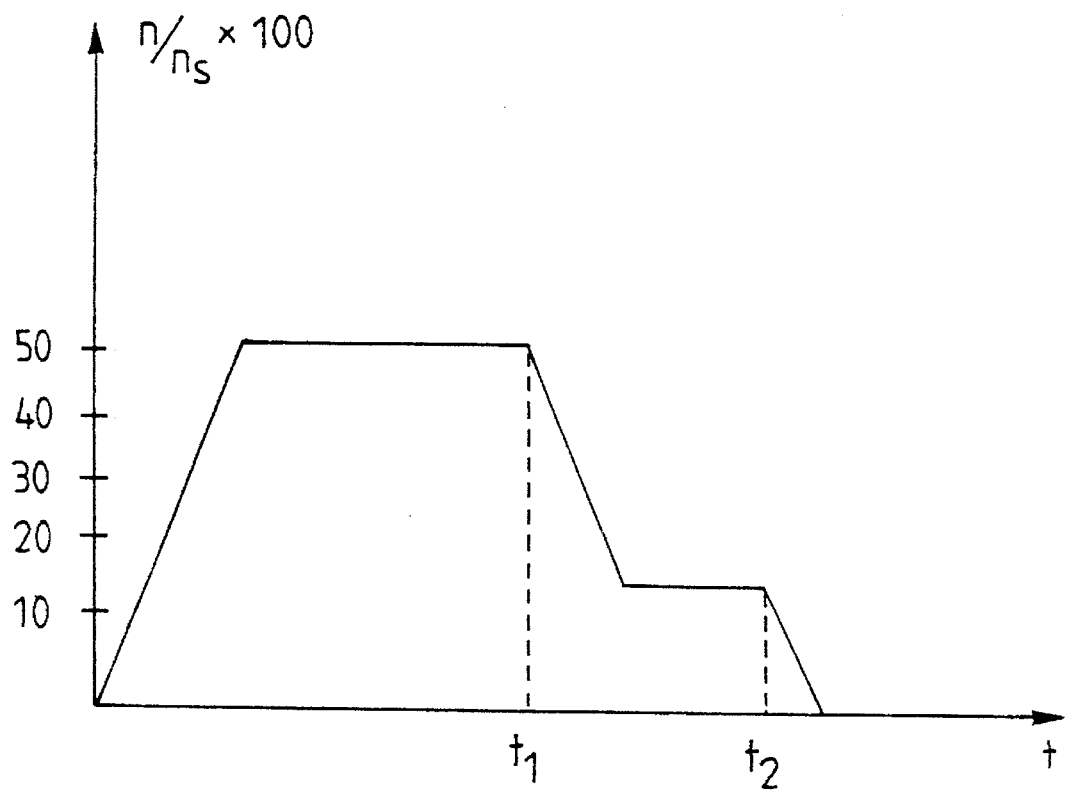
FIG. 1 shows a speed profile for positioning drive to which the method according to the invention is applicable.

FIG. 1 shows a speed profile for positioning drive to which the method according to the invention can be applied. In this speed profile, the motor is started at a time 0, and its rotation speed is adjusted such that it is operated at a frequency at least about 50% of the rated frequency of the motor up to a time $t_1$. In order that the method according to the invention could be applied, the time interval from 0 to $t_1$ should be at least equal to a mechanical time constant of a combination formed by the motor and a load device. After $t_1$ the motor is commanded to a frequency no more than 20% of the rated frequency of the motor. The motor is driven at such a low speed up to a time $t_2$, after which the motor is switched off. In the method according to the invention, a term kT to be added to the set value of the rotation speed of the motor is calculated at $t_1$ by Equations (1) to (3) presented above. According to the invention, the term kT is used as such for slip compensation up to $t_2$. This value stored in a memory is thus no more changed during the rest of the positioning drive.

Figure 2:
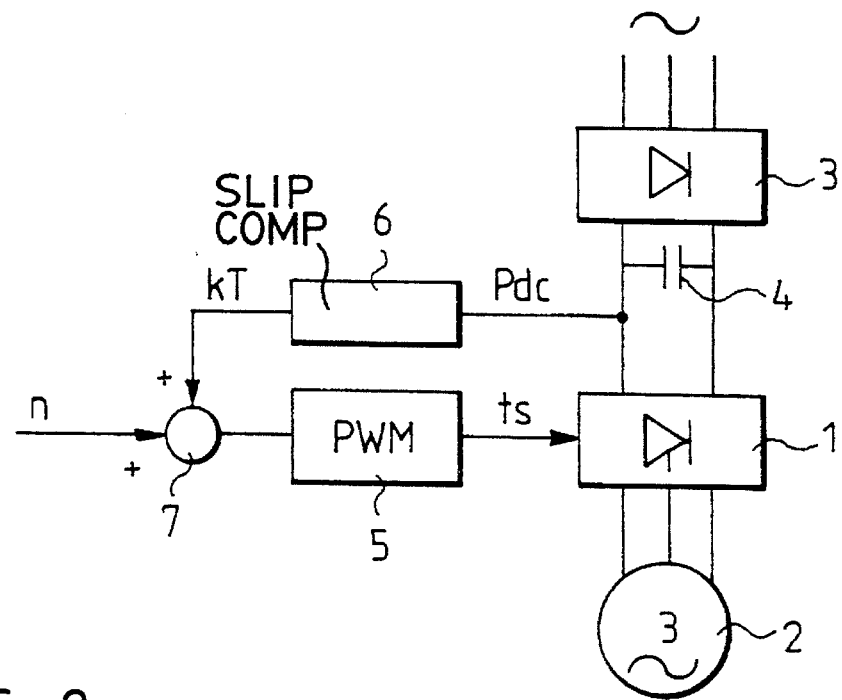
FIG. 2 is a block diagram illustrating a device suitable for realizing the method according to the invention.

FIG. 2 shows a block diagram illustrating generally a device suitable for realizing the method according to the invention. In this arrangement, a power obtained from a three-phase network is rectified e.g. by a diode bridge 3, whereafter the rectified voltage is filtered in a capacitor 4 and applied to an inverter 1, which in turn feeds a motor 2. The inverter is controlled by a pulse-width modulator 5, which applies an electric stator frequency fs to the inverter as a frequency command. If the slip of the motor is not to be compensated for, this frequency is calculated merely from the set value of the rotation speed n of the motor. In order that the slip could be compensated for, the arrangement further comprises a slip compensation circuit 6, which measures a DC power Pdc from an intermediate circuit between the rectifier 3 and the inverter 1. The slip calculation circuit 6 then calculates the torque T of the motor on the basis of the DC power, and multiplies it with an appropriate constant k. This gives a compensation term kT, which is added to the set value of the rotation speed n in an adder 7 so as to obtain a slip-compensated stator frequency fs in accordance with Equation 1. In the method according to the invention, the slip calculation circuit 6 shown in FIG. 2 stores, in the positioning drive illustrated in FIG. 1, the term kT in the memory at $t_1$, and applies only this value to the adder 7 when the value of the set rotation speed n requires that the motor be fed at a frequency less than 20% of the rated frequency of the motor. Accordingly, the compensation accuracy can be improved by calculating the compensation value kT used during drive at a low approach frequency at a high constant frequency, whereby the effect of dissipation powers on the calculation accuracy of the value is insignificant.

I claim:

1. Method for slip compensation in a squirrel cage induction motor, comprising the steps of:

feeding the motor from an inverter without feedback at a supply frequency less than 20% of the rated supply frequency of the motor after the motor has first been fed at a frequency more than 50% of the rated frequency for a period of time $t_1$ at least equal to a mechanical time constant of a combination formed by the motor and a load device;

determining a compensation term kT proportional to the torgue T of the motor;

adding to a set value of the motor rotation speed to effect slip compensation of the motor, a value of said compensation term kT being stored in a memory before transition from a frequency more than 50% of the rated motor frequency to a frequency less than 50% of the rated motor frequency; and applying the stored compensation term for slip compensation when the supply frequency of the motor is less than 20% of the rated frequency of the motor for a period from time $t_1$ to a time $t_2$.

2. A method for slip compensation of a squirrel cage induction motor fed by an inverter without feedback, comprising the steps of:

controlling the slip compensation by a control signal dependent on a set value of the motor rotation speed; and adjusting the control signal whenever the supply frequency of the motor is less than 20% of the rated motor frequency by the addition said set value of a compensation term proportional to the torque of the motor when the supply frequency to the motor is greater than 50% of the rated frequency.

3. A method according to claim 2, further comprising the step of determining said compensation term by initially running the motor at a supply frequency more than 50% of the rated frequency for a period of time at least equal to a mechanical time constant of a combination formed by the motor and a load device.

4. A method according to claim 2, further comprising the step of storing said compensation in a memory for addition to said set value when the supply frequency is greater than 50% of the rated frequency.

5. A method according to claim 3, further comprising the step of storing said compensation in a memory for addition to said set value when the supply frequency is greater than 50% of the rated frequency.

* * * * *